(12) United States Patent
Altman et al.

(10) Patent No.: US 7,865,699 B2
(45) Date of Patent: Jan. 4, 2011

(54) METHOD AND APPARATUS TO EXTEND THE NUMBER OF INSTRUCTION BITS IN PROCESSORS WITH FIXED LENGTH INSTRUCTIONS, IN A MANNER COMPATIBLE WITH EXISTING CODE

(75) Inventors: Erik R Altman, Danbury, CT (US); Michael Gschwind, Chappaqua, NY (US); David A. Luick, Rochester, MN (US); Daniel A. Prener, Briarcliff Manor, NY (US); Jude A. Rivers, Cortlandt Manor, NY (US); Sumedh W. Sathaye, LaGrangeville, NY (US); John-David Wellman, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 11/931,815

(22) Filed: Oct. 31, 2007

(65) Prior Publication Data
US 2008/0065861 A1 Mar. 13, 2008

Related U.S. Application Data

(63) Continuation of application No. 10/720,585, filed on Nov. 24, 2003, now Pat. No. 7,340,588.

(51) Int. Cl.
*G06F 9/00* (2006.01)
(52) U.S. Cl. .................................................. 712/210
(58) Field of Classification Search .................. 712/210
See application file for complete search history.

(56) References Cited

U.S. PATENT DOCUMENTS

| | | | | |
|---|---|---|---|---|
| 5,390,307 A | * | 2/1995 | Yoshida | 712/225 |
| 5,666,510 A | * | 9/1997 | Mitsuishi et al. | 711/220 |
| 5,854,921 A | * | 12/1998 | Pickett | 712/239 |
| 5,935,237 A | * | 8/1999 | Chiba et al. | 712/42 |
| 6,308,258 B1 | * | 10/2001 | Kubota et al. | 712/210 |

(Continued)

OTHER PUBLICATIONS

Peter Song; "Demystifying EPIC and IA-64, EPIC Is a Natural Evolution of RISC, Making It Easy to Retrofit Onto RISC"; Microdesign Resources, Jan. 26, 1998.*
The Run-time Architecture Team, The 32-bit PA-RISC Run-time Architecture Document, 1997.*

(Continued)

*Primary Examiner*—Niketa I Patel
*Assistant Examiner*—Benjamin P Geib
(74) *Attorney, Agent, or Firm*—Harrington & Smith

(57) ABSTRACT

This invention pertains to apparatus, method and a computer program stored on a computer readable medium. The computer program includes instructions for use with an instruction unit having a code page, and has computer program code for partitioning the code page into at least two sections for storing in a first section thereof a plurality of instruction words and, in association with at least one instruction word, for storing in a second section thereof an extension to each instruction word in the first section. The computer program further includes computer program code for setting a state of at least one page table entry bit for indicating, on a code page by code page basis, whether the code page is partitioned into the first and second sections for storing instruction words and their extensions, or whether the code page is comprised instead of a single section storing only instruction words.

25 Claims, 4 Drawing Sheets

U.S. PATENT DOCUMENTS 6,314,504 B1 * 11/2001 Dent ........................... 711/212
6,397,379 B1 * 5/2002 Yates et al. .................. 717/140
6,877,084 B1 * 4/2005 Christie ...................... 712/203

OTHER PUBLICATIONS

Motorola, MCF5249 Integrated ColdFire Microprocessor Product Brief, 2002.*

* cited by examiner

METHOD AND APPARATUS TO EXTEND THE NUMBER OF INSTRUCTION BITS IN PROCESSORS WITH FIXED LENGTH INSTRUCTIONS, IN A MANNER COMPATIBLE WITH EXISTING CODE

CROSS REFERENCE TO RELATED APPLICATIONS

This patent application is a continuation of U.S. patent application Ser. No. 10/720,585, filed on Nov. 24, 2003 now U.S. Pat. No. 7,340,588.

TECHNICAL FIELD

This invention relates generally to digital data processor architectures and, more specifically, relates to program instruction decoding and execution hardware that operates with either fixed or variable length instruction words.

BACKGROUND

A number of data processor instruction set architectures (ISAs) operate with fixed length instructions. For example, several Reduced Instruction Set Computer (RISC) architecture data processors, such as one known as the PowerPC™ (PowerPC is trademark of the International Business Machines Corporation), feature instruction words that have a (fixed) width of 32 bits. Another conventional architecture, known as IA-64 EPIC (Explicitly Parallel Instruction Computer), uses a fixed format of three instructions per 128 bits, and a 32-bit Modifier field (the first word in every quadword) that provides up to 10 additional instruction bits for each of the next three instructions of the quadword.

As instruction pipelines become deeper and memory latencies become longer, more instructions must be in flight (executing) at once in order to keep data processor execution units well utilized. However, in order to increase the number of non-memory operations in flight, it is generally necessary to increase the number of registers in the data processor, so that independent instructions may read their inputs and write their outputs without interfering with the execution of other instructions. Unfortunately, in most RISC architectures there is not sufficient space in a 32-bit opcode (instruction word) for operands to specify more than 32 registers, i.e., 5-bits per operand, with most operations requiring three operands and some requiring two or four operands.

In addition, as the conventional fixed-width data processor architectures age, new applications become important, and these new applications may require new types of instructions to run efficiently. For example, in the last few years multimedia vector extensions have been made to several ISA's, for example SSE-2 for the IA-32 architecture and VMX (also known Altivec™, a trademark of Motorola, Inc., or by Velocity Engine™, a trademark of Apple Computer, Inc.) for the PowerPC™ architecture. However, with only a fixed number of bits in an instruction word, it has become increasingly difficult or impossible to add new instructions/opcodes to many architectures.

Several techniques for extending instruction word length have been proposed and used in the prior art. For example, Complex Instruction Set Computer (CISC) architectures generally allow the use of a variable length instruction. However variable instruction lengths have at least three significant drawbacks.

A first drawback to the use of variable length instructions is that they complicate the decoding of instructions, as the instruction length is generally not known until at least a part of the instruction has been read, and because the positions of all operands within an instruction are likewise not generally known until at least part of the instruction is read.

A second drawback to the use of variable length instructions is that variable length instructions may cross a memory page boundary. In modern data processors having address translation this means that both the lower order and higher order parts of the instruction address must be checked to ensure that they have a valid mapping from the effective address space given by the instruction pointer to the physical address space of the machine, with an appropriate exception being signaled if one or both parts of the instruction address do not have a valid mapping. It is noted that page crossings cannot occur if: (1) instructions have a fixed width of 32-bits (or equivalently 4 bytes, or any number of bytes that is a power of 2); and (2) instruction addresses are aligned on a "natural" byte boundary corresponding to the width of the instruction, e.g., 4 byte instructions on 4-byte boundaries.

A third drawback to the use of variable length instructions is that instructions of variable width are not compatible with the existing code for fixed width data processor architectures.

The use of a fixed width 64-bit instruction word (or other higher powers of two) would avoid the first two problems, but not the third. However, the use of 64-bit instructions introduces the further difficulty that the additional 32-bits beyond the current 32-bit instruction words are far more than what is needed to specify the numbers of additional registers required by deeper instruction pipelines, or the number of additional opcodes likely to be needed in the foreseeable future. The use of excess instruction bits wastes space in main memory and in instruction caches, thereby slowing the performance of the data processor.

The above-mentioned IA-64 architecture packs three instructions into 16 bytes (128-bits), for an average of 42.67 bits per instruction. While this type of instruction encoding avoids problems with page and cache line crossing, this type of instruction encoding also exhibits several problems, both on its own, and as a technique for extending other fixed instruction width ISAs.

First, and without incurring significant implementation difficulty (likely slowing the execution speed and requiring significantly more integrated circuit die area), this technique allows branches to go only to the first of the three instructions, whereas most other architectures allow branches to any instruction.

Second, this technique also "wastes" bits for specifying the interaction between instructions. For example, "stop bits" are used to indicate if all three instructions can be executed in parallel, or whether they must be executed sequentially, or whether some combination of the two is possible.

Third, the three instruction packing technique also forces additional complexity in the implementation in order to deal with three instructions at once.

Finally, the three instruction packing format for IA-64 has no requirement to be compatible with existing 32-bit instruction sets. As a result, there is no obvious mechanism to achieve compatibility with other fixed width instruction encodings, such as the conventional 32-bit RISC encodings.

Prior to this invention, the problems that were inherent in the prior art instruction word extension approaches were not adequately addressed or solved.

SUMMARY OF THE PREFERRED EMBODIMENTS

The foregoing and other problems are overcome, and other advantages are realized, in accordance with the presently preferred embodiments of this invention.

This invention provides a method and an apparatus to augment instruction sets that use fixed width instructions to include additional or extra instruction bits per instruction word. The extra instruction word bits are added in a manner that is compatible with existing conventional fixed instruction width code, and permit the mixing of conventional and augmented instructions, with one type directly invoking the other (without operating system intervention). A feature of this invention is that the number of bits that are added is not excessive as compared to what is required to specify a reasonable number of additional registers and/or opcodes. For example, in a presently preferred embodiment only eight bits are added to a 32-bit instruction word. Another feature of this invention is that the widened or augmented instructions never cross a page boundary, and thus require only one access to a translation lookaside buffer (TLB), and furthermore will not generate a page fault exception in the middle of an instruction. Another feature of this invention is that the widened instructions have a fixed width (e.g., 40 bits in the preferred embodiment when starting from an instruction set that employs 32-bit instructions), and thereby the problems associated with variable width instruction words are avoided. In addition, the widened instructions made possible by the use of this invention do not require any changes in the way the program counter is updated, nor do they impose any restrictions on the operation of branch instructions (e.g., any instruction can be the target of a branch instruction).

In the preferred embodiment of this invention instructions at the end of the page are skipped when updating the program counter sequentially, or by using a branch at the end of a page.

A feature of this invention is a divided code page structure, guaranteeing that instructions and their extensions lie on the same code page.

Another feature of this invention is the use of at least one page table entry bit for indicating instruction length on a page-by-page basis.

While the exemplary embodiment describes a page-table selected embodiment, the teachings of the present invention can be practiced with a variety of selection techniques. One non-limiting example of such a selection technique uses one of a per-process bit, a per-segment bit, or a global mode bit such as a bit in the machine state register (MSR). In another embodiment, this mode maybe entered by executing a specially designated instruction that indicates that such a mode is entered, e.g., a special "switch" instruction, or a "jump and switch", "branch subroutine and switch", or "return from subroutine" instruction.

A still further feature of this invention is in providing an ability to maintain existing instruction address semantics. For example, during sequential code execution the program counter is still updated by the same number of bytes (e.g., four bytes) as in the original architecture to point to the next instruction.

This invention pertains to apparatus, method and a computer program stored on a computer readable medium. For example, the computer program includes instructions for use with an instruction unit having a code page, and has computer program code for partitioning the code page into at least two sections for storing in a first section thereof a plurality of instruction words and, in association with at least one instruction word, for storing in a second section thereof an extension to the at least one instruction word. The computer program further includes computer program code for setting a state of at least one page table entry bit for indicating, on a code page by code page basis, whether the code page is partitioned into the first and second sections for storing instruction words and at least one instruction word extension, or whether the code page is comprised instead of a single section storing only instruction words.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

It is noted at the outset that this invention will be described below in the context of an extension of 32-bit instruction words, of a type commonly employed in RISC architectures, to 40-bit instruction words. However, instruction width augmentation for other fixed width instruction sizes (e.g., 40-bits, 64-bits, or 128-bits, including bundle-oriented instruction sets such as some Very Long Instruction Word (VLIW) architectures such as one known as IA-64 (Intel Corporation)) are also within the scope of this invention, as is the instruction width augmentation of 32-bit instruction words to other than 40-bit instruction words (e.g., to 48-bits, or to 56-bits). The invention is also described in the context of a page size of 4096 bytes (1024, 32-bit instructions). However, the use of other page sizes (more or less than 4096 bytes) is also clearly within the scope of this invention. Thus, those skilled in the art should realize that the ensuing description, and specific references to numbers of bits, instruction widths and code page sizes is not intended to be read in a limiting sense upon the practice of this invention.

Figure 1A:
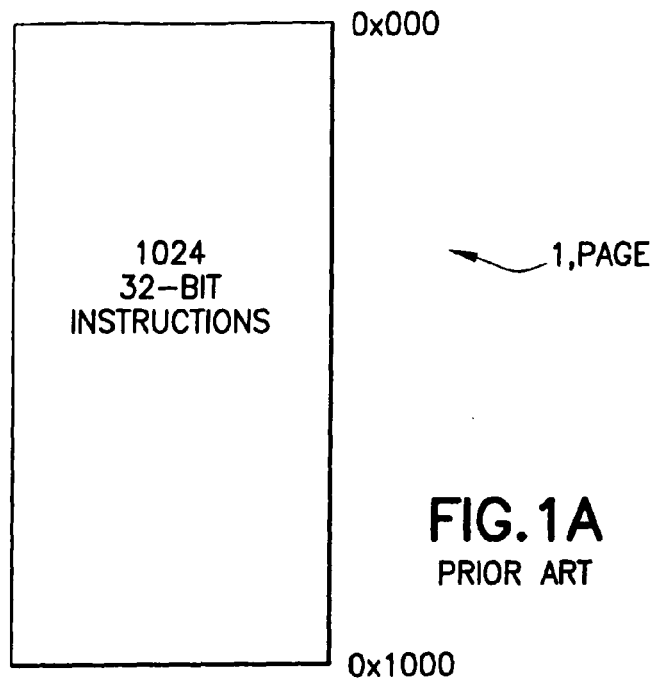
FIG. 1A illustrates a conventional code page.
Figure 1B:
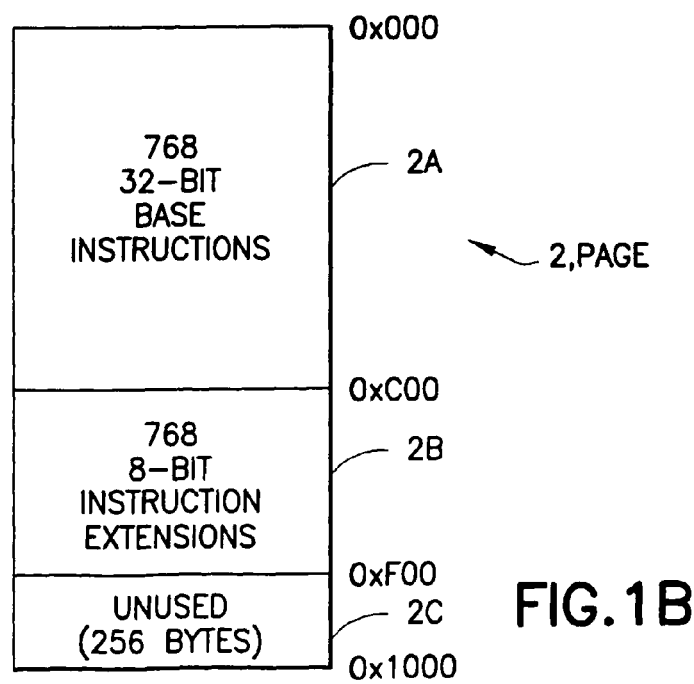
FIG. 1B illustrates an improved code page in accordance with this invention.

FIG. 1A illustrates a conventional memory page 1 containing, in this example, 1024, 32-bit instructions (4096 bytes at address offsets 0x000 to 0xFFF). FIG. 1B illustrates an improved memory page 2 in accordance with this invention, having a first area 2A containing 768 32-bit base instructions, a second area 2B containing 768 8-bit instruction extensions, and a third area 2C that is currently unused (256 bytes).

In this embodiment of the invention the upper one fourth of a (standard 4096-byte) code page is reserved for storing extensions to instructions in the lower three quarters of the code page. In other words, the lower 3072 bytes, offset 0x000 to 0xBFF, of the page hold 768 32-bit instructions. The upper 1024 bytes, offset 0xC00 to 0xFFF, hold 768 8-bit instruction extensions, one for each of the 768 instructions. The upper 256 bytes of the page (or 1/16 of the page) is not required, and in this embodiment is not used.

Specifically, the instruction at offset 0x000 has a 1-byte extension at offset 0xC00, the instruction at offset 0x004 has a one byte extension at offset 0xC01, and so forth up to the instruction at 0xBFC, which has a one byte extension at offset 0xEFF. In general if an instruction is at offset Q on a page (0<=Q<=0xBFC), then the one byte extension is at offset (0xC00|(Q>>2)), which is a straightforward computation for hardware.

Furthermore, in that all instructions and their extensions are always on the same page, only a single translation lookaside buffer (TLB) lookup is necessary. Furthermore, neither the instructions or their extensions ever cross page boundaries.

It should be noted that in a given code page, every 32-bit basic instruction has a corresponding 8-bit extension, or no 32-bit basic instruction has an 8-bit extension. In the preferred embodiment, whether a page is of the first type or of the second type is determined by a value of a bit in the Page Table Entry (PTE) for that page. Whenever code is executed using address translation (which is almost always in modern processors), each page has a corresponding PTE, whose contents are normally determined by the operating system. When code is executed without using address translation, all instructions are treated as 32-bit basic instructions and there are no extensions. Whether address translation is used is also normally determined by the operating system and conveyed to the processor via a bit in the processor's machine state register (MSR). For code pages employing 8-bit extensions to each 32-bit basic instruction, extensions are supplied for all 768 basic instructions, even if the extended instruction results in the same function (e.g., a no-operation (NOP) function) as would have been conveyed by the 32-bit basic instruction.

Figure 2:
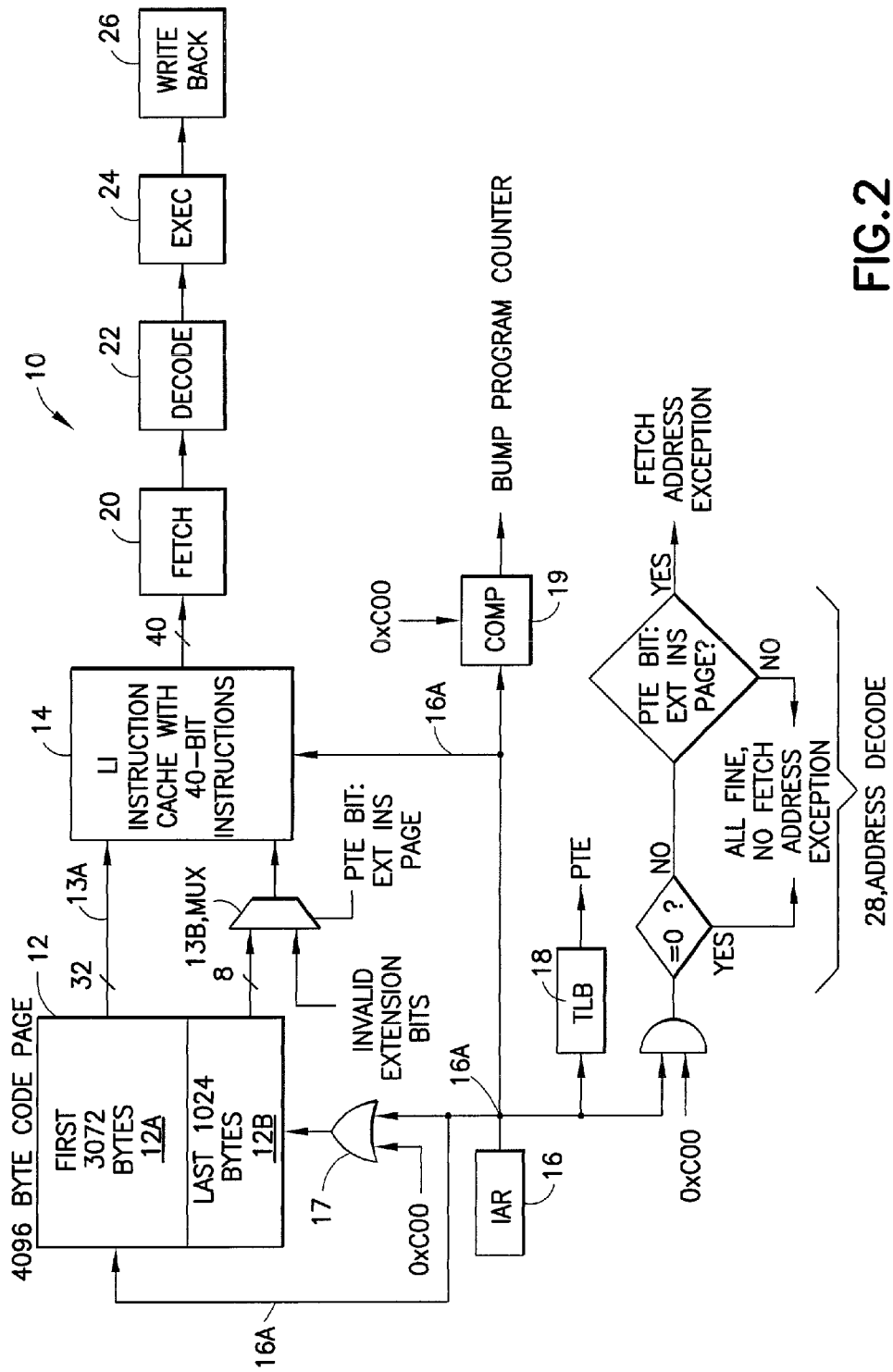
FIG. 2 is a block diagram of a portion of an instruction unit that is constructed and operated in accordance with a first embodiment of this invention.
Figure 3:
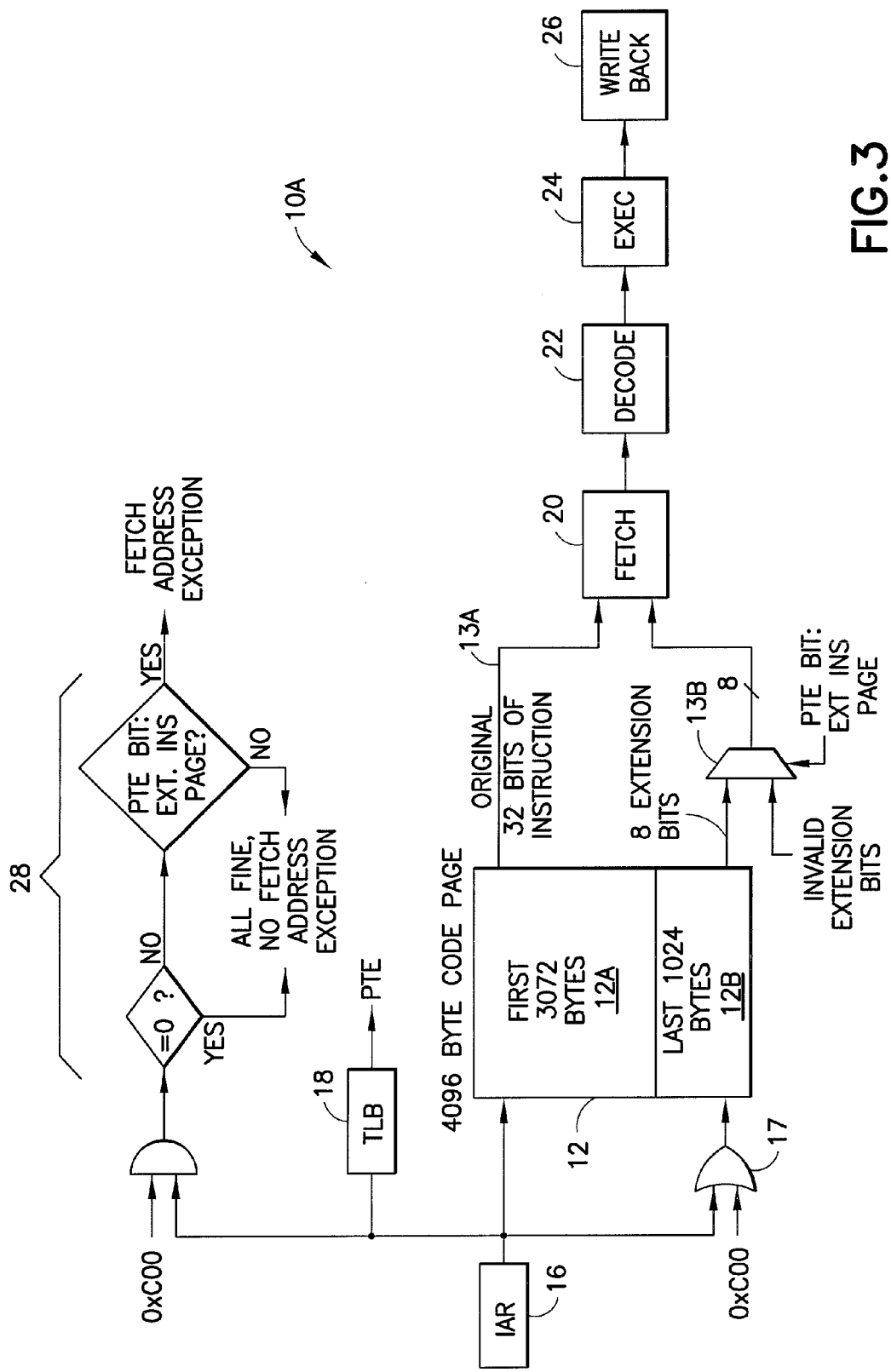
FIG. 3 is a block diagram of a portion of an instruction unit that is constructed and operated in accordance with a second embodiment of this invention.
Figure 4:
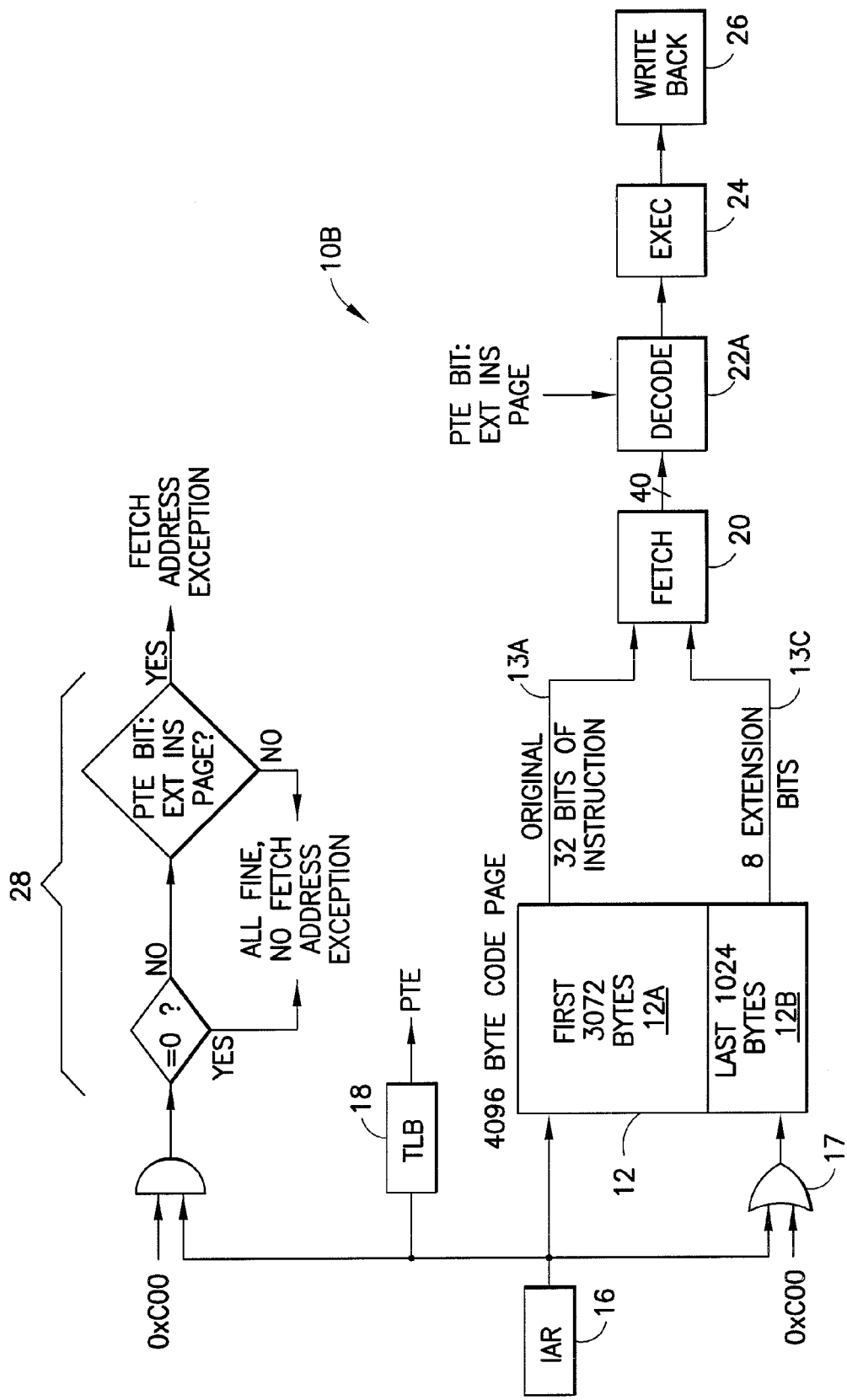
FIG. 4 is a block diagram of a portion of an instruction unit that is constructed and operated in accordance with a third embodiment of this invention.

The basic 32-bit instructions and their 8-bit extensions may be combined into a single 40-bit instruction at several points. FIGS. 2, 3 and 4 illustrate three embodiments of instruction units 10, 10A and 10B, respectively, having different locations where the 32-bit instructions and the 8-bit extensions are combined into 40-bit instructions. FIG. 2 is a most presently preferred embodiment, while FIGS. 3 and 4 depict less presently preferred embodiments. Circuit elements and components that are common to the three embodiments are numbered the same.

FIG. 2 shows a 4096 byte code page 12 that is partitioned, as shown in FIG. 1B, into a first section 12A and second section 12B. The first section 12A stores the 768 32-bit base instructions, while the second section 12B stores up to 768 8-bit instruction extensions, as well as the unused 256 byte portion. Code page 12 is assumed is assumed to be, or is loaded from, a level 2 (L2) or higher cache, or from main memory. The outputs of the code page 12 are provided, in this embodiment, to a level 1 (L1) instruction cache (Icache) 14, via 32-bit original instruction bus 13A and via an 8-bit multiplexer (MUX) 13B. The L1 instruction cache 14 stores 40-bit instructions that are indexed with the address of the 32-bit base instruction output from an instruction address register (IAR) 16 on instruction address bus 16A. The instruction address bus 16A is also applied to the first and last portions of the code page 12, with the address of the second section 12B being offset by 0xC00 with OR gate 17 so as to address a corresponding 8-bit extension to the 32-bit basic instruction currently being addressed in section 12A. The MUX 13B selects either the 8-bit extension output of the code page 12 or the eight (invalid) extension bits, under control of a Page Table Entry (PTE) bit referred to as an Extended Instruction Page (Ext_Ins_Page) bit. The PTE Ext_Ins_Page bit is output from a translation lookaside buffer (TLB) 18, and specifies on a page-by-basis whether a particular page contains all 32-bit instructions, or contains all 40-bit instructions, i.e., whether a particular page contains only standard 32-bit instructions, or contains all 40-bit extended instructions (instructions having 32-bits stored in the first section 12A, and eight additional extended bits stored at the same address (offset by 0xC00) in the second section 12B).

The output of the L1 instruction cache 14 is applied to the input of a 40-bit wide, otherwise conventional instruction processing pipeline having a fetch stage 20, a decode stage 22, an execution stage 24 and a writeback stage 26. The use of the invention with other instruction processing pipeline architectures should be readily apparent to those skilled in the art.

The instruction unit 10 also includes address decoding logic 28 that operates for page addresses above 0xC00 to determine if the PTE bit Ext_Ins_Page is true. If it is, then a Fetch Address Exception condition is indicated, if the IAR 16 generates an instruction fetch address whose low order 12 bits are equal to or greater than 0xC00 (an address in the second section 12B of the code page 12) (i.e., when the IAR should be addressing a 32-bit base instruction in the first section 12A (address: 0x000<0xC00) of the code page 12).

It should be noted that if the Ext_Ins_Page bit is not true, then the IAR 16 can freely generate instruction addresses for the entire 1024 word code page 12, including instruction addresses in the range of 0xC00 to 0xFFC, in a conventional manner.

In FIG. 3 the L1 instruction cache 14 is eliminated, and the output of the code page 12 is applied directly to the fetch stage 20, via the 32-bit original instruction bus 13A and the 8-bit MUX 13B. As in the embodiment of FIG. 2, the MUX 13B is under control of the Ext_Ins_Page PTE bit, but in this case the combination of the 32-bit instruction and the 8-bit extension is performed in the fetch stage 20, as opposed to being performed in the L1 instruction cache 14.

In the embodiment of FIG. 4 the MUX 13B is eliminated, and the output of the code page 12 is applied directly to the fetch stage 20, via the 32-bit original instruction bus 13A and via an 8-bit extended instruction bus 13C. In this embodiment the decode stage 22 of the instruction pipeline is controlled by the Ext_Ins_Page PTE bit to either ignore or decode the eight extension bits, on a page-by-page basis, and the combination of the 32-bit instruction and the 8-bit extension is thus performed in the fetch stage 20 and selectively in the decode stage 22.

Discussing the foregoing embodiments now in further detail, in the embodiment of FIG. 2 the combination of the 32-bit instruction and the 8-bit extension is performed when instructions are brought from the level 2 (L2) cache 12 to the L1 instruction cache (Icache) 14. In this case, the Icache 14 contains essentially 40-bit semi-decoded instructions that appear to originate from 32-bit instructions. Although the Icache entries originate from two lines in the L2 cache 12, the 8-bit extension for each instruction can never appear as a separate entry in the L1 Icache 14, due to the operation of the address decode circuitry 28, mentioned above and discussed in further detail below. Any instructions that invalidate the contents of a portion of the Icache 14 (e.g., the Instruction Cache Block Invalidate (ICBI) instruction in the PowerPC™ architecture) have a somewhat more complicated implementation with the L1 instruction cache 14, as the instruction cache line must detect an ICBI to two block locations (the base instruction block and the extension block), instead of just one block. However, ICBI-type instructions are relatively infrequent and relatively slow, and their logic is normally not on a critical path. Thus, a two-block check does not present a significant implementation problem.

There are at least two techniques to determine whether an instruction has 8-bits of associated extended instruction, and these techniques are independent of the technique for combining the 32-bit and 8-bit portions of instructions into a single 40-bit instruction.

In the first technique a new mode bit may be added to the machine state register (MSR), which when true indicates that the instruction fetch should use the 40-bit extended scheme, with traditional fixed width (32-bit) instructions being used otherwise. This technique is compatible with existing code, and allows the 40-bit extensions to be used in any number of applications. However, the use of the MSR is not presently preferred, as its use requires operating system intervention to change modes (as modifying the MSR is generally only permitted when a processor is in "supervisor" state). This technique also does not allow code with traditional 32-bit instructions to call, and be called by, code with 40-bit extended instructions.

In the presently preferred technique, the one depicted in FIGS. 2, 3 and 4, the PTE bit is employed to determine whether a particular page contains 32-bit or 40-bit instructions. On those pages with at least one 40-bit instruction a fetch to offsets from 0xC00 to 0xFFC is illegal, and results in the generation of a protection fault. The check for the protection fault is accomplished relatively easily by the address decode logic 28 by extending the traditional TLB check to also check the top two bits of the page offset, i.e., by masking the fetched address with 0xC00 (binary: 1100 0000 0000). If the result is non-zero on a page with 40-bit instructions, there is a protection fault, i.e. there was an attempt to fetch from the instruction extension portion 12B of the code page 12 instead of from the valid instruction portion 12A. The use of the TLB 18 PTE technique thus allows for code to be of length 32-bits or 40-bits on a page-by page basis. Furthermore, code of one type can call code of the other type on a different page. Further, if most code requires only traditional 32-bit instructions, then very little additional code storage is required, as most instructions and most pages would be of the traditional (32-bit instruction length) variety.

To most effectively implement this invention the instruction pipeline 20-26 is modified as necessary to incorporate the additional numbers of bits and, as in FIG. 4, to incorporate the change to the instruction decoder 22. A 25% larger L1 Icache 14 is also employed. In addition, software that is stored on a computer readable medium, such as compilers, linkers and loaders, is modified to accommodate the use of optional 40-bit instructions. However, similar changes may be required for any technique that is intended to extend the instruction width for an ISA. As an example of these software modifications, the XCOFF or ELF executable files produced on Unix and Linux systems are preferably augmented with information about which pages contain 32-bit instructions and which contain 40-bit instructions. The loader module then enters this information in to the PTE of the TLB 18 when a program is initiated.

The software that is stored on the computer readable medium is designed, in accordance with this invention, to accommodate the selective partitioning of the code page 12, and the setting of the state of the PTE bit in the TLB 18.

It should be noted that more than one bit in a PTE may be used to support multiple instruction sizes. For example, two PTE bits can be used to specify normal (32-bit) instruction word widths, or 40-bit instruction word widths, or 48-bit instruction word widths, or 56-bit instruction word widths, with corresponding changes being made to the sizes of the 32-bit code portion 12A and the extended code portion 12B of the code page 12.

There are further considerations and advantages that arise from the use of this invention. For example, on pages with 40-bit instructions the last instruction must branch to the start of the next page, in order to skip over the extended code region 12B, if the instruction that would have "naturally" occupied this location on the page is not an unconditional branch, or to the branch target, if the instruction that would have "naturally" occupied this last location on the page is an unconditional branch. Alternatively, additional hardware (e.g., a comparator 19 (shown in FIG. 2) having an input coupled to the output address bus 16A of the IAR 16) can be used to determine if the last instruction on a page is being executed. If instruction execution would otherwise "fall through" to the start of the instruction extensions, e.g.: fall_through_address_AND 0xCFF=0xC00, then the program counter is bumped to the start of the next page.

The "unused" space (256 bytes) at the end of a page of 40-bit instructions may be used for certain purposes. These include, but are not limited to, storing constant values, storing security information, and storing CRC or checksum of other error detection and/or correction information to guarantee the integrity of the page. Such uses need not be defined in the architecture, and may be specified by the software.

While described thus far in the context of fixed width basic instructions (e.g., 32-bit basic instructions and extensions thereof), this invention can also be used with variable width instruction architectures. For example, it is known that variable width instruction architectures can run out of "prefix bits" for indicating the number of bytes in a variable width instruction. In such cases the techniques used by this invention for extending fixed basic instruction widths may be employed to extend the number of bits available in a variable width instruction, and hence allow additional "prefix bits" to be specified, if needed.

In general, each instruction word has a width of x bits and each instruction word extension has a width of y bits, where x=n*(8-bits), where y=m*(8-bits), where n is an integer greater than one (e.g., n=4, or n=8), and where m has a value less than one, equal to one, or greater than one for providing an overall instruction word of the desired width. For example, m may be 0.5 for providing an instruction word extension of 4-bits, or m may be 1.0 for providing an instruction word extension of 8-bits, or m may be 1.5 for providing an instruction word extension of 12-bits.

Based on the foregoing, and in view of the presently preferred embodiments discussed above, it can be appreciated that this invention enables eight additional bits of extended opcode for each existing 32-bit instruction of an instruction set. The use of these eight bits of extended opcode is sufficient to add two bits to each of four register fields, and to thus permit up to 128 registers to be directly addressed in every instruction. Since most machines of interest have multiple register files, e.g. integer and floating point registers, the use of this invention allows each of these files to be extended from, for example, 32 entries to 128 entries. Alternatively, some or all of the additional instruction bits may be used to specify new instruction types for execution.

Furthermore, the use of this invention does not require any change to the computation of a next instruction address, nor does it impose any restriction on branch instructions (other than they not branch to an instruction extension in the code page section 12B).

The teachings of this invention are compatible with existing RISC code and, using as little as a single bit with each PTE (the Extended Instruction Page (Ext_Ins_Page) bit), this invention allows code with 40-bit instructions to be intermixed with traditional 32-bit instructions, with no mode change or supervisor activity required. Beneficially, in that the basic instructions and their extensions are always located on the same page 12, only a single TLB 18 lookup is necessary. Neither the instructions nor their extensions ever cross page boundaries.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, and as was noted above, this invention is not limited to the use of any specific instruction widths, instruction extension widths, code page memory sizes, specific sizes of partitions or allocations of code page memory and the like, nor is this invention limited for use with any one specific type of hardware architecture or programming model, nor is this invention limited to a particular instruction pipeline. The use of other and similar or equivalent embodiments may be attempted by those skilled in the art. However, all such and similar modifications of the teachings of this invention will still fall within the scope of this invention.

Further, some of the features of the present invention could be used to advantage without the corresponding use of other features. As such, the foregoing description should be considered as merely illustrative of the principles of the present invention, and not in limitation thereof.

What is claimed is:

1. A digital data processor comprising an instruction unit, said instruction unit comprising a code page that is partitioned for storing in a first section thereof a plurality of instruction words and, in association with at least one instruction word, in a second section thereof an extension to said at least one instruction word,
    where said first section is comprised of a first plurality of storage locations, and where said second section is comprised of a second plurality of storage locations, and where said at least one instruction word and said extension to said at least one instruction word are one of fixed length and variable length program instructions, wherein each of the first and second section is comprised of contiguous storage locations,
    where at least some of the second storage locations are not allocated for storing instruction word extensions.

2. A digital data processor as in claim 1, where said at least some of the second storage locations that are not allocated for storing instruction word extensions are allocated instead for storing at least one of constant values, security information, and error detection and/or correction information for the code page.

3. A digital data processor as in claim 1, further comprising an address comparator for detecting when program execution has reached the end of the first section for ensuring that a next instruction address is not contained in the second section.

4. A digital data processor as in claim 1, further comprising circuitry, coupled to an output of said code page, to combine an addressed instruction word read out of said code page with a corresponding instruction word extension that is also read out of said code page.

5. A digital data processor as in claim 4, where said combining circuitry comprises an input stage of an instruction pipeline.

6. A digital data processor as in claim 4, where said combining circuitry comprises an instruction decode stage of an instruction pipeline.

7. A digital data processor comprising an instruction unit, said instruction unit comprising a code page that is partitioned for storing in a first section thereof a plurality of instruction words and, in association with at least one instruction word, in a second section thereof an extension to said at least one instruction word, further comprising at least one page table entry bit having a state for indicating, on a code page by code page basis, whether the code page is partitioned into said first and second sections for storing instruction words and at least one instruction word extension, or whether the code page is comprised instead of a single section storing only instruction words, wherein each of the first and second section is comprised of contiguous storage locations.

8. A digital data processor as in claim 7, where said at least one page table entry bit is output from a translation lookaside buffer (TLB).

9. A digital data processor as in claim 7, further comprising address fault circuitry for determining, in accordance with a state of the at least one page table entry bit, whether a generated instruction address is a valid address for the code page.

10. A digital data processor as in claim 7, further comprising address circuitry for addressing an instruction word in said first section using a current instruction address, while simultaneously addressing an extension to said instruction word at a fixed offset from said current instruction address.

11. A digital data processor as in claim 7, further comprising circuitry, coupled to an output of said code page, to selectively combine, in response to the state of said at least one page table entry bit, an addressed instruction word read out of said code page with a corresponding instruction word extension that is also read out of said code page.

12. A digital data processor as in claim 11, where said combining circuitry comprises an instruction decode stage of an instruction pipeline.

13. A method to operate an instruction unit having a code page, comprising:
    partitioning said code page into at least two sections;
    storing in a first section thereof a plurality of instruction words and, in association with at least one instruction word, storing in a second section thereof an extension to said at least one instruction word, wherein each of the at least two sections is comprised of contiguous storage locations; and
    detecting when program execution has reached the end of the first section for ensuring that a next instruction address is not contained in the second section.

14. A method as in claim 13, further comprising setting a state of at least one page table entry bit for indicating, on a code page by code page basis, whether the code page is partitioned into said first and second sections for storing instruction words and at least one instruction word extension, or whether the code page is comprised instead of a single section storing only instruction words.

15. A method as in claim 14, further comprising outputting said at least one page table entry bit from a translation lookaside buffer (TLB).

16. A method as in claim 14, further comprising determining, in accordance with a state of the at least one page table entry bit, whether a generated instruction address is a valid address for the code page.

17. A method as in claim 14, further comprising addressing an instruction word in said first section using a current instruction address, while simultaneously addressing an extension to said instruction word at a fixed offset from said current instruction address.

18. A method as in claim 13, where said first section is comprised of a first plurality of storage locations, and where said second section is comprised of a second plurality of storage locations, and where said program instructions are one of fixed length and variable length program instructions, where said at least some of the second storage locations that are not allocated for storing instruction word extensions are allocated instead for storing at least one of constant values, security information, and error detection and/or correction information for the code page.

19. A method as in claim 13, where said first section is comprised of a first plurality of storage locations, and where said second section is comprised of a second plurality of storage locations, and where said program instructions are one of fixed length and variable length program instructions, further comprising combining an addressed instruction word read out of said code page with a corresponding instruction word extension that is also read out of said code page.

20. A method as in claim 19, where combining occurs at an input stage of an instruction pipeline.

21. A method as in claim 19, where combining occurs at an instruction decode stage of an instruction pipeline.

22. A method as in claim 13, further comprising selectively combining, in response to the state of said at least one page table entry bit, an addressed instruction word read out of said code page with a corresponding instruction word extension that is also read out of said code page.

23. A method as in claim 22, where selectively combining comprises operating an instruction decode stage of an instruction pipeline.

24. A computer program stored on a computer readable medium, said computer program comprising instructions for use with an instruction unit having a code page, comprising:

computer program code for partitioning said code page into at least two sections for storing in a first section thereof a plurality of instruction words and, in association with at least one instruction word, for storing in a second section thereof an extension to said at least one instruction word, wherein each of the first and second section is comprised of contiguous storage locations; and computer program code for setting a state of at least one page table entry bit for indicating, on a code page by code page basis, whether the code page is partitioned into said first and second sections for storing instruction words and at least one instruction word extension, or whether the code page is comprised instead of a single section storing only instruction words, where at least some of the second storage locations are not allocated for storing instruction word extensions.

25. A computer program as in claim 24, further comprising computer program code for ensuring that a last instruction in said first section is a branch instruction the execution of which does not specify a target address that lies in the second section.

* * * * *